United States Patent
Meunier et al.

(10) Patent No.: US 6,642,170 B1
(45) Date of Patent: Nov. 4, 2003

(54) SOLID OXIDATION CATALYSTS, IN PARTICULAR FOR EPOXIDATION OF PROCHIRAL COMPOUNDS

(75) Inventors: Damien Meunier, Lyons (FR); Arnaud Piechaczyk, Lyons (FR); Aimery De Mallman, Lyons (FR); Jean-Marie Basset, Villeurbanne Cedex (FR)

(73) Assignee: Centre National de la Recherche Scientifique (C.N.R.S.), Paris (FR)

( * ) Notice: Subject to any disclaimer, the term of this patent is extended or adjusted under 35 U.S.C. 154(b) by 0 days.

(21) Appl. No.: 09/743,913

(22) PCT Filed: Jul. 16, 1999

(86) PCT No.: PCT/FR99/01750

§ 371 (c)(1),
(2), (4) Date: Mar. 6, 2001

(87) PCT Pub. No.: WO00/03802

PCT Pub. Date: Jan. 27, 2000

(30) Foreign Application Priority Data

Jul. 17, 1998  (FR) .............................................. 98 09328

(51) Int. Cl.⁷ ......................... C07D 301/03; B01J 31/02
(52) U.S. Cl. ....................................... 502/171; 549/523
(58) Field of Search ........................... 549/523; 502/171

(56) References Cited

U.S. PATENT DOCUMENTS 5,275,994 A    1/1994   Weissman et al. .......... 502/171

FOREIGN PATENT DOCUMENTS

| EP | 0 193 682 | 9/1986 |
|----|-----------|--------|
| EP | 0 230 983 | 8/1987 |
| EP | 0 776 699 | 6/1997 |

*Primary Examiner*—Alan L. Rotman
*Assistant Examiner*—Raymond Covington
(74) *Attorney, Agent, or Firm*—Young & Thompson

(57) ABSTRACT

The invention concerns recyclable solid oxidation catalysts comprising a metal compound of a pentavalent or hexavalent metal M and selected among the group consisting of tantalum, vanadium, niobium, chromium, molybdenum, tungsten, grafted at the surface of a solid oxide with at least one, preferably one, covalent bond between an oxygen atom of the solid oxide and the metal M atom, the grafted metal compound having at least two alkoxy groups bound to the metal by the oxygen atom. Preferably, at least 2 alkoxy groups bound to the metal M belong to a polyol unit, preferably diol. The invention also concerns oxidation methods, in particular epoxidation methods using same.

23 Claims, No Drawings

ID="1" />
SOLID OXIDATION CATALYSTS, IN PARTICULAR FOR EPOXIDATION OF PROCHIRAL COMPOUNDS

The present invention relates to novel solid oxidation catalysts which make possible in particular the oxidation of prochiral compounds, in particular the asymmetric epoxidation of prochiral olefinic double bonds, more particularly of a carbinol compound exhibiting an ethylenic double bond separated from the carbinol group by 0 to 1 C, preferably those of allyl alcohols, to their method of preparation and the use of these solid catalysts in epoxidation reactions.

The introduction of a chiral center onto organic molecules has quite considerable industrial potentialities. This is because natural products are normally chiral, with only one enantiomer exhibiting a useful biological activity. Medicaments, agrochemicals, cosmetics or more generally any molecule which is used in life sciences generally belong to this family of chiral compounds with one or more centers of asymmetry. The separation of the enantiomers from a racemic mixture is expensive, lengthy and not economically profitable. One of the solutions envisaged for improving this irrefutable fact was to find catalysts, which are predominantly homogeneous. These catalysts are generally transition metal complexes which exhibit chiral ligands. Numerous enantioselective catalytic reactions exist.

In particular, the synthesis of enantiopure epoxyalcohols, used in particular as precursors of active principles for pharmaceutical products, is very important industrially (B. E. Rossiter "Asymmetric Synthesis", Academic Press, 1985, vol. 5, pp. 193–246; M. Bulliard and W. Shum, "Proceedings of the Chiral'95 USA symposium" 1995, pp. 5–8; U.S. Pat. No. 4,764,628).

The catalysts currently known for reactions of this type are generally chiral titanium compounds used in the homogeneous liquid phase, according to the principle proposed by Katsuki and Sharpless (J. Am. Chem. Soc., 1980, 102, 5974 and U.S. Pat. No. 4,471,130), and cannot be reused (in this document, the chiral compounds can also be tantalum, zirconium, hafnium, niobium, vanadium and molybdenum compounds and the like). See also Johnson and Sharpless "Comprehensive Organic Synthesis", Pergamon Press, 1991, vol. 7, pp. 389–436 and "Catalytic Asymmetric Synthesis", edited by I. Ojima, VCH, 1993, 103–158; Gao, Sharpless et al., J. Am. Chem. Soc., 1987, 109, 5765–5780. However, these catalysts cannot be easily separated from the reaction medium and their separation is, in some cases, particularly harmful to the reaction yield. Furthermore, they cannot be recycled and they cannot be used in a continuous process.

Farrall et al. (Nouv. J. Chim., 1983, 7, 449) describe a tartrate grafted onto a polystyrene resin. A titanium alkoxide was grafted onto such a solid and similar results but ones much inferior to those described by Sharpless et al. were obtained. Another publication by Choudary et al. (J. Chem. Soc., Chem. Commun., 1990, 1186) also described the incorporation of titanium-based Sharpless complexes in a clay of montmorillonite type. The solid proved to be active in asymmetric epoxidation but was not recycled. A publication by Adam, Corma et al. (J. Mol. Catal. A., 1997, 117, 357) reports diastereoselective and non-enantioselective epoxidations of allyl alcohols with aqueous hydrogen peroxide solution catalyzed by titanium-comprising zeolites. However, in this case, the starting allyl alcohols are already chiral and the catalysts achiral. These catalysts were not recycled.

A. Corma et al. (J. Mol. Catal. A., 1996, 107, 225–234) have proposed a molybdenum catalyst supported in a zeolite with a chiral ligand. It would be possible to recycle this catalyst but its enantioselectivity is low.

An object of the present invention is to provide novel solid oxidation catalysts which can be easily and efficiently recycled.

A more particular object of the present invention is to provide heterogeneous catalysis for the oxidation of prochiral compounds which combines the following properties:

performances (rate of reaction, activity per catalytic site, reaction yield and selectivity, enantiomeric excess obtained) equal to or superior to those of the homogeneous catalysts currently used, ease of separation from the reaction medium, reusable, while retaining the performances, and optionally usable in a continuous process.

A more particular object of the invention is to provide such heterogeneous catalysis for the asymmetric epoxidation of prochiral olefinic double bonds, in particular those of allyl alcohols.

A first subject-matter of the present invention is a solid oxidation catalyst comprising a metal compound of a pentavalent or hexavalent metal M, selected from the group consisting of tantalum, vanadium, niobium, chromium, molybdenum and tungsten, grafted to the surface of a solid oxide by at least one, preferably one, covalent bond between an oxygen atom of the solid oxide and the metal atom M, the grafted metal compound exhibiting at least two alkoxy groups bonded to the metal via the oxygen atom, preferably at least one of these alkoxy groups being chiral.

The preferred metals are tantalum, vanadium and niobium. The most preferred metal is tantalum.

The alkoxy groups OR bonded to the metal M via the oxygen atom are identical or different (different means that at least one of the R radicals is different from the others). The R radicals are $C_1$ to $C_{30}$, preferably $C_1$ to $C_8$, more preferably still $C_1$ to C6, hydrocarbonaceous chains which can be aliphatic or unsaturated, optionally cyclic, in particular aromatic, and which can optionally be functionalized, for example by halide, alcohol or ester functional groups and the like. The R radicals are preferably selected from methyl, ethyl, n-propyl, isopropyl, n-butyl, isobutyl, tert-butyl, cyclohexyl, vinyl, allyl, phenyl or trialkylsilyl ($R_3Si$—; R=Me, Et, i-Pr or n-Bu).

According to a preferred form of the invention, at least 2 alkoxy groups bonded to the metal M belong to a polyol unit, in particular a triol or diol unit, preferably a diol unit. These polyol units confer on the catalyst a chiral group of high stability which cannot be easily displaced or exchanged under the effect of other molecules when the catalyst will be employed in an epoxidation reaction.

Mention may be made, among the chiral diol units which come under the present invention, of:

1,2-propylene glycol 2,3-butanediol 3,4-dimethyl-3,4-hexanediol 4,5-octanediol 2,3-hexanediol 1,3-di(p-nitrophenyl)propane-1,2-diol 2,4-pentanediol tartaric acid esters, for example:
   dimethyl tartrate
   diethyl tartrate
   diisopropyl tartrate distearyl tartrate
diphenyl tartrate
tartaric acid diamide
N,N-dimethyl tartaric acid diamide
trans-1,2-cyclopentanediol
diethyl 1,2-cyclohexanediol-1,2-dicarboxylate
dimethyl 2,4-dihydroxyglutarate
ethyl N,N-diethyl tartrate monoamide
2,5-dioxo-3,4-octanediol
1,2-bisacetylethylene glycol
bis-2,2'-(2-hydroxycaprolactone)
binaphthol
1,2-bis(methoxyphenyl)ethane-1,2-diol.

Diethyl or diisopropyl tartrate units are preferred.

Generally, the metal compound grafted onto the solid oxide preferably comprises 4 alkoxy groups when the metal M is selected from tantalum, vanadium or niobium and 4 or 5 alkoxy groups when the metal is selected from chromium, molybdenum or tungsten, those optionally belonging to a polyol unit being included within these values.

The oxidation catalysts according to the invention can also be defined by their process of preparation. It is possible, for the preparation of the catalyst, to preferably start from a complex of the metal M.

The precursor complexes of tantalum or another metal, which are used to create the bond between the metal M and the oxygen of the support (solid oxide), comprise appropriate identical or different ligands, at least one of which can be substituted by an oxygen of the solid oxide, for example an oxygen of a siloxy group in the case of silica, for the formation of at least one covalent bond between an oxygen atom of the solid oxide and the metal atom M. The ligands can be in all or part, in particular completely, alkoxy groups as described above, including polyol groups, or nonalkoxy ligands which, at a subsequent stage in the grafting of the metal complex to the solid oxide, can be substituted by alkoxy groups. The complex can comprise more than one metal atom M but will preferably be monoatomic for this metal. These complexes can correspond to the following general formula:

where:
M is the metal selected from tantalum, vanadium, niobium, chromium, molybdenum or tungsten
a is an integer ranging from 4 to 6, it being understood that, when a=6, M is chromium, molybdenum or tungsten and it being understood that it is possible to have a double or a triple bond
b is an integer ranging from 1 to 4
c is an integer ranging from 0 to 16
X are ligands which can be identical or different (different means that at least one of the ligands X is different from the others) and are selected from:
  the above R radicals
  OR as described above with respect to the alkoxy groups,
  acac (acetylacetonate)
  $NR_2$, with R as above
  halogen atom, in particular Cl, Br or I,
L is any neutral (neither anionic nor cationic) molecular ligand, for example EtOH, $NH_3$, pyran, and the like.
Preferably b=1. Preferably c=0.

Mention may in particular be made, among the complexes which can be used, of those which follow:
  $[(CH_3)_3CCH_2]_3TA$=$CHC(CH_3)_3$ or any compound exhibiting at least one Ta-C bond and preferably several of these bonds, in particular a compound of the $TaR_5$ type, with R, which are identical or different, in particular identical, as above, preferably selected from methyl, ethyl, n-propyl, isopropyl, n-butyl, isobutyl, tert-butyl, cyclohexyl, vinyl, allyl, phenyl or trialkylsilyl ($R_3Si$—; R=Me, Et, i-Pr or n-Bu), such as, for example, $Ta(Me)_5$;
  $Ta(OC_2H_5)_5$ or more generally $Ta(OR)_5$, with R identical or different, in particular identical, as above:
  $Ta(acac)(OC_2H_5)_4$ or more generally $Ta(acac)_x(OR)_{5-x}$, at the same level with x=1 or 2 and R identical or different, in particular identical, as above;
  $TaCl_5$, $TaBr_5$ or $TaI_5$.

The operation is carried out in the same way with vanadium, niobium, chromium, molybdenum and tungsten, the appropriate precursors being chosen where tantalum is replaced with the chosen metal, taking into account its own valency, for example:
  if M=V or Nb:
    $MR_5$, $M(OR)_5$, $M(acac)_x(OR)_{5-x}$, or $M(halogen)_5$
  if M=Cr, Mo or W:
    $MR_6$, $M(OR)_6$, $M(acac)_x(OR)_{6-x}$ or $M(halogen)_6$
  with x=1 or 2
  with R identical or different, preferably identical, as above.
By way of examples:
  $WCl_6$
  $MoCl_6$
  $W(OEt)_6$
  $W(CH_2C(CH_3)_3)_3(\equiv CC(CH_3)_3)$.

The preferred substrate is silica. However, other inorganic oxides can be envisaged; for example alumina, silica/alumina, zeolites, including silicalites, titanium oxide, niobium oxide, tantalum oxide, mesoporous silicas, and the like. The solid oxide, for example silica, will preferably be such as obtained by an exhaustive heat treatment (with the intention of providing partial dehydroxylation and dehydration), for example between 200 and 1100° C. for several hours (for example 10 to 20 hours). Of course, a person skilled in the art will take care not to exceed the decomposition temperature or stability limit temperature of the solid oxide which he has chosen to use. For silica, the dehydration is generally carried out between 200 and 500° C. to 800° C., preferably between 400 and 800° C., e.g. at 500 or at 700° C. approximately, in particular if it is desired to obtain, in addition, the formation of surface siloxane bridges.

According to an advantageous form of the invention, the support, in particular silica, can be treated, before grafting the metal complex, with organosilicon compounds. These compounds include methylpolysiloxanes, such as hexamethyldisiloxane or octamethylcyclotetrasiloxane, methylpolysilazanes, such as hexamethyldisilazane (the preferred), or hexamethyl-cyclotrisilazane, chlorosilanes, such as dimethyldichlorosilane, trimethylchlorosilane, methyl-vinyldichlorosilane or dimethylyinylchlorosilane, or alkoxysilanes, such as dimethyldimethoxysilane, dimethylyinylethoxysilane or trimethylmethoxysilane.

The complex can be transferred onto the solid oxide in particular by sublimation or by impregnation in solution.

In the case of sublimation, the organometallic complex in the solid state is heated, preferably under vacuum (or under an inert gas) and under temperature conditions which provide for its sublimation and its migration in the vapor state onto the solid oxide, which is preferably itself in the pulverulent state or in the form of pellets or the like. Sublimation is in particular carried out between 50 and 150° C., preferably at approximately 80° C. The deposition can be monitored, for example by infrared spectroscopy. The grafting takes place by reaction of the complex with the functional groups of the support (OH, Si-O-Si, and the like). The solid will preferably be maintained at a temperature greater than or equal to ambient temperature.

It may be desirable to remove, by reverse sublimation, the excess unreacted complex which has simply been adsorbed at the surface of the oxide.

The grafting of the metal complex on the solid oxide can also be carried out by impregnation, a suspension of solid oxide and the metal complex being brought directly into contact. The suspension is preferably formed of solid oxide in a solvent, in particular a non-polar solvent, such as pentane. The whole reaction is preferably carried out under an inert atmosphere, e.g. argon. The grafting reaction is in particular carried out with stirring for several hours, the solid subsequently being filtered off, washed and dried, and stored under an inert atmosphere.

If it is desired to prepare a catalyst comprising alkoxy groups, it is advisable to subsequently treat the solid obtained with an alcohol, selected in particular from ethanol, methanol, isopropanol and butanol, preferably with vapors of an alcohol, in particular of one of those mentioned above. The most preferred form is the treatment with ethanol vapors. The reaction can be carried out in particular in a temperature range extending from 25 to 150° C. for several hours, in particular at least 5 hours. The amount of alcohol introduced into the receptacle comprising the silica or another solid oxide modified by the metal compound should preferably be greater than 0.1 mol of alcohol per gram of silica or other solid oxide. After the heat treatment, the solid is preferably treated under dynamic vacuum, in particular lasting at least 5 hours at 150° C. This treatment with an alcohol is not absolutely necessary, in particular if the starting material is a precursor complex already having alkoxy groups in order to graft it to the silica.

A subject-matter of the invention is thus the oxidation catalysts which can be obtained by the implementation of the process which has just been described.

More particularly, the invention is targeted at a chiral solid catalyst which makes possible in particular the oxidation of prochiral compounds, in particular the asymmetric epoxidation of prochiral double bonds, preferably those of carbinol compounds exhibiting an ethylenic double bond which is separated by 0 to 1 carbon atoms from the carbinol group, in particular allyl and homoallyl alcohols, in order to produce chiral epoxyalcohols. The targeted reaction is an enantioselective reaction.

In this application, use is made of a solid catalyst in accordance with the preferred form indicated above, namely comprising a polyol unit, preferably a diol unit. For its preparation, the starting materials are a precursor catalyst, as defined above by its characteristics or its process of preparation, preferably comprising alkoxy groups, more particularly having from 4 to 5 alkoxy groups, and a chiral polyol, in particular a chiral diol, preferably selected from those mentioned above, so as to exchange at least two OR groups by the polyol, in particular the diol, and thus to form the polyol or diol unit connected to the metal via oxygen atom(s).

The amount of chiral diol added should preferably be adjusted so as to obtain a diol:metal molar proportion of at least 0.5, in particular of between 0.5 and 3, it being known that higher proportions may be effective but are not essential. In the case of a tantalum catalyst, with diethyl tartrate as chiral diol, the optimal proportion is [tartrate:Ta] between 1 and 2. This makes it possible to prepare a catalyst which will result in a good epoxide yield and in an advantageously enantiomeric excess, for example in the case of the epoxidation of allyl alcohol to glycidol or of trans-2-hexen-1-ol to propyloxirane-methanol.

This exchange or substitution of OR group or more generally X group, as defined above, by a diol is preferably carried out in a solvent for the diol used, e.g. dichloromethane or pentane, these two solvents being, for example, well suited to the case of diethyl tartrate and of diisopropyl tartrate. The reaction medium comprising the diol and the solid oxide to which the metal compound is grafted is preferably kept stirred for a sufficient time until the relevant chiral catalyst is obtained, generally more than 10 or 15 hours (up to 48 hours), the medium being maintained at low temperature, in particular less than or equal to 0° C., preferably between 0 and −20° C. approximately.

The medium obtained, comprising the catalyst, can be used as is for the epoxidation reaction. While awaiting its use, it is preferable to store the catalyst at low temperature, as indicated, and preferably between 0 and −20° C. It is also possible to filter the catalyst. In particular, for long-term storage, it is preferable to filter off the catalyst and to store it under cold conditions, in particular between 0 and −40° C.

Another subject-matter of the invention is thus this method of functionalization of the alkoxide-comprising oxidation catalysts and the chiral solid catalysts capable of being obtained by the implementation of this method.

This chiral solid catalyst, based on tantalum or on another metal grafted to the surface of silica or the like, is used in particular in the epoxidation of carbinol compounds as defined above, preferably of allyl alcohols, with organic hydroperoxides as epoxidation agents, as is fully known per se. They are usually aliphatic hydroperoxides, which may be mono- or polyhydroperoxides, most commonly not having more than two hydroperoxy groups. Monohydroperoxides, in particular having from 1 to 20 carbon atoms, and more particularly from 1 to 12 carbon atoms, remain the commonest. Use is preferably made of hydroperoxides R"OOH, such as in particular R"=cumyl, tert-butyl, triphenylmethyl, n-butyl, methyl, ethylphenyl, pinanyl or trityl.

The enantiomeric excesses are of the same order of magnitude as those obtained with titanium in homogeneous catalysis. However, highly advantageously, the catalyst is filtered off and is reused for a fresh catalytic test and similar results are then obtained. The recycling can be carried out several times without a significant loss in activity or in stereoselectivity. Furthermore, it has been possible to demonstrate that the tantalum or other metal does not pass into solution and that the solid retains its same content of tantalum or other metal after several recycling operations. Surprisingly, if the same experiment is carried out with titanium complexes, a very low activity without an enantiomeric excess is then obtained, demonstrating, if it were necessary, the entirely unexpected nature of the invention.

Another subject-matter of the present invention is thus a method for the oxidation of prochiral compounds, in which the prochiral compound, an oxidant and a solid catalyst according to the invention are brought into contact and are reacted together. A particular subject-matter of the invention is a method for the asymmetric epoxidation of prochiral olefinic double bonds of a compound to be epoxidized, more particularly of a carbinol compound exhibiting an ethylenic double bond separated from the carbinol group by 0 to 1 C, preferably those of allyl alcohols, in which method the prochiral compound to be oxidized, in particular the allyl alcohol or the like, is brought into contact and is reacted together with a chiral solid catalyst according to the invention, comprising alkoxy groups and a group of the chiral polyol type, preferably chiral diol type, and an oxidant, in particular organic hydroperoxide or hydrogen peroxide.

The present invention is targeted in particular at the asymmetric epoxidation of allyl alcohols in general, unsubstituted or substituted, including polysubstituted, by groups such as methyl, ethyl, n-propyl, isopropyl, n-butyl, isobutyl, tert-butyl, $C_nH_{2n+1}$ alkyl groups with n=5 to 15, cyclohexyl, vinyl, allyl, phenyl or trialkylsilyl ($R_3Si—$; R=Me, Et, i-Pr or n-Bu).

Mention may particularly be made, among the allyl alcohols which come under the present invention, of:

base allyl alcohol (2-propen-1-ol): $CH_2$=$CHCH_2OH$ allyl alcohols substituted in the 2-position: $CH_2$=$C(R)$ $CH_2OH$ geraniol nerol linalol allyl alcohols monosubstituted in the 3E-position: $CH(R)$=$CHCH_2OH$ allyl alcohols monosubstituted in the 3Z-position: $CH(R)$=$CHCH_2OH$ allyl alcohols disubstituted in the (2 and 3Z or 3E)-positions: $CH(R^1)$=$C(R^2)CH_2OH$ allyl alcohols disubstituted in the (3, 3)-positions: $C(R^1)(R^2)$=$CHCH_2OH$ allyl alcohols trisubstituted in the (2, 3, 3)-positions: $C(R^1)(R^2)$=$C(R^3)CH_2OH$ allyl alcohols monosubstituted in the 1-position: $CH_2$=$CHCH(R)OH$ allyl alcohols disubstituted in the (1, 1)-positions: $CH_2$=$CHC(R^1)(R^2)OH$ allyl alcohols disubstituted in the (1, 2)-positions: $CH_2$=$C(R^1)CH(R^2)OH$ allyl alcohols disubstituted in the (1 and 3Z or 3E)-positions: $CH(R^1)$=$CHCH(R^2)OH$ allyl alcohols trisubstituted in the (1, 1, 2)-positions: $CH_2$=$C(R^1)C(R^2)(R^3)OH$ allyl alcohols trisubstituted in the (1, 1 and 3Z or 3E)-positions: $CH(R^1)$=$CHC(R^2)(R^3)OH$ allyl alcohols trisubstituted in the (1, 2 and 3Z or 3E)-positions: $CH(R^1)$=$C(R^2)CH(R^3)OH$ allyl alcohols trisubstituted in the (1, 3, 3)-positions: $C(R^1)(R^2)$=$CHCH(R^3)OH$ allyl alcohols tetrasubstituted in the (1, 1, 2 and 3Z or 3E)-positions: $CH(R^1)$=$C(R^2)C(R^3)(R^4)OH$ allyl alcohols tetrasubstituted in the (1, 1, 3, 3)-positions: $C(R^1)(R^2)$=$CHC(R^3)(R^4)OH$ allyl alcohols tetrasubstituted in the (1, 2, 3, 3)-positions: $C(R^1)(R^2)$=$C(R^3)CH(R^4)OH$ allyl alcohols pentasubstituted in the (1, 1, 2, 3, 3)-positions: $C(R^1)(R^2)$=$C(R^3)C(R^4)(R^5)OH$ with R, $R^1, R^2, R^3, R^4$ and $R^5$ selected, independently from one another, from:

methyl, ethyl, n-propyl, isopropyl, n-butyl, isobutyl, tert-butyl, $C_nH_{2n+1}$ alkyl groups with n=5 to 15, cyclohexyl, vinyl, allyl, phenyl or trialkylsilyl ($R_3Si—$; R=Me, Et, i-Pr or n-Bu).

The substrate to be oxidized, in particular to be epoxidized, for example allyl alcohol, is subsequently introduced into the medium (solvent+catalyst, maintained at a temperature of between +20 and −20° C., preferably between 0 and −20° C.) in a proportion such that the [substrate:metal] molar ratio is in particular between 1 and 10 000, preferably between 2 and 1 000, preferably between 4 and 200, in particular in the case of the epoxidation of an allyl alcohol catalyzed by a solid prepared from a compound of tantalum or other metal.

Throughout the duration of the epoxidation reaction, the reaction medium is preferably maintained between +20 and −20° C., in particular between 0 and −20° C.

The solvent used for the epoxidation reaction is preferably nonpolar and can be, for example, dichloromethane, pentane, hexane, and the like. This solvent can be distilled beforehand. It must, in any case, be employed carefully dehydrated; for this, it can be stored over a 3 Å or 4 Å zeolite sieve, itself well dehydrated beforehand (for example by heat treatment under vacuum at 300° C. for at least 15 hours). The amount of solvent used is adjusted according to the concentration of allyl alcohol desired in the reaction medium at the beginning of the reaction. A concentration of allyl alcohol of at least 0.1M in the solvent is advisable. When the solvent is introduced into the reactor in order to suspend the solid (supported metal compound) a dehydrating agent, such as zeolite 3 Å, preferably as a powder and well dehydrated beforehand, can be added to the reaction medium.

The oxidant is introduced slowly into the reaction medium. The epoxidation agents used are described above and are advantageously organic hydroperoxides ROOH, such that R=cumyl, tert-butyl, triphenylmethyl, α-phenylbenzyl, α, α'-methylphenyl-benzyl, pinanyl, n-butyl or methyl, and optionally hydrogen peroxide $H_2O_2$, preferably in an anhydrous medium. These oxidants are preferably carefully dehydrated before being introduced into the reaction medium, for example over zeolite. It is preferable for the [oxidant:substrate to be epoxidized] molar ratio to be greater than 1 in order to obtain as great a conversion as possible of the substrate to epoxide. In the examples mentioned below, the value of this [oxidant:substrate to be epoxidized] ratio is approximately 2.

The mixture is subsequently left to stir, in particular for 4 to 48 hours, while keeping the temperature constant, e.g. at a value fixed between +20 and −20° C. The reaction medium is subsequently filtered in order to collect, on the one hand, the solid, and, on the other hand, the filtrate. The solid is washed several times with the solvent and the liquid phases are combined together. The product can then be isolated and the solvent recycled.

It should be noted that, in the present application, proportions or ratios refers to molar proportions or molar ratios.

The invention will now be described in more detail using embodiments taken as non-limiting examples.

EXAMPLES

Example 1 (Comparative Example)

This example illustrates the fact that the deposition of titanium alkoxide on a silica heat treated beforehand at a temperature of 500° C. under dynamic vacuum (silica 500) does not result in a catalyst which comes under the present invention, whereas a titanium alkoxide used in homogeneous medium results in a catalyst which is effective for the epoxidation of allyl alcohol to glycidol.

1-a A mass of 2.174 g of Degussa "Aerosil® 200" silica, wetted beforehand with water and then dried, is treated in a hermetically sealed Schlenk tube under dynamic vacuum (P<5×10$^{-5}$ mbar) at a temperature of 500° C. for 15 hours. After returning this powder (silica 500) to ambient temperature, 20 ml of thoroughly dry n-pentane, distilled beforehand over sodium/potassium amalgam and stored under argon in the presence of zeolite 4 Å, followed by 251 mg of titanium tetraisopropoxide, are carefully introduced into the Schlenk tube without re-exposing to the air and under an argon atmosphere. This mixture is stirred for 4 hours at ambient temperature. A reaction takes place with the emission of isopropanol, demonstrated by gas chromatography. The mixture is subsequently filtered through sintered glass, still carefully under an argon atmosphere, and the solid thus recovered is washed four times with 10 ml of thoroughly dehydrated pentane and then dried under dynamic vacuum at ambient temperature for 15 hours and then at 60° C. for 2 hours. This solid is subsequently stored under argon. Chemical analysis shows that it comprises contents by mass of 1.8% of titanium and of 3.03% of carbon, which corresponds to a C/Ti molar ratio of 6.7.

A mass of 215 mg of this solid (81 µmol of Ti) is subsequently withdrawn and placed under argon in a 100 ml round-bottomed flask in which the epoxidation reaction will subsequently be carried out. Afterwards, 1 g of zeolite 3 Å, dehydrated beforehand at 300° C., and then 10 ml of carefully dehydrated dichloromethane are introduced and this mixture is maintained at 0° C. 0.1 ml of a 1.0M solution of diisopropyl (+)-tartrate (100 µmol) in dichloromethane is subsequently added and the mixture is stirred for 15 hours at 0° C. An amount of 97 mg of allyl alcohol (1.67 mmol) is then introduced, which corresponds to a Ti/allyl alcohol molar ratio of 5/100. Then, 30 minutes later, 0.74 ml of 80% technical grade cumyl hydroperoxide (Aldrich), dehydrated beforehand over 3 Å sieve (approximately 4.0 mmol), is slowly added over 30 minutes. The combined mixture is left to stir for 48 hours at 0° C. The reaction medium is subsequently filtered in order to recover, on the one hand, the solid and, on the other hand, the filtrate. The solid is washed five times with the solvent and the liquid phases are combined together. An amount of 40 mg of n-dodecane (235 µmol), used as reference compound, is added thereto and the filtrate is analyzed by gas chromatography (GC) on a cyclodextrin phase chiral column (Lipodex E from Macherey-Nagel). This method gives the glycidol yield, 14% with respect to the starting amount of allyl alcohol charged, the degree of conversion of the allyl alcohol, 17%, and thus also the selectivity of the reaction, 82%, and the enantiomeric excess, approximately 9% (predominantly R-glycidol). As the amount of glycidol formed is very low, the product was not isolated in this case. This shows that this silica, modified by supported titanium, is not a catalyst which is sufficiently active for this reaction. Quantitative determination of the content of titanium in the solid by elemental chemical analysis after its use as catalyst, followed by washing with dichloromethane a number of times at ambient temperature, showed that there was no loss of titanium from the solid (1.8% of Ti by mass).

1-b The same reaction was repeated but this time it was carried out in a homogeneous medium, using 470 mg of titanium tetraisopropoxide (1.68 mmol) instead of the solid prepared by impregnation with silica with this same compound (Example 1-a), 2 g of powdered zeolite 3 Å, 64 ml of dichloromethane and 2.0 ml of a 1.0M solution of diisopropyl (+)-tartrate (2.0 mmol) in dichloromethane. The combined mixture is stirred in a round-bottomed flask for 4 hours at 0° C. 1.86 g of allyl alcohol (32 mmol) and then, 30 minutes later, 11.5 ml of 80% technical grade cumyl hydroperoxide (Aldrich), dried beforehand over 3 Å sieve (approximately 64 mmol), are subsequently introduced successively. This corresponds to a Ti/allyl alcohol molar ratio of 5/100. The combined mixture is left to stir for 48 hours at 0° C. in order for the epoxidation reaction to take place. Glycidol is then produced with yield of 72%, a selectivity of 95% and an enantiomeric excess of 80% (predominantly S-glycidol).

Example 2 (comparative example)

This example illustrates the unexpected fact that a tantalum alkoxide deposit on silica 500, followed by treatment with diisopropyl tartrate, results in a catalyst which is active in asymmetric epoxidation, whereas, in a homogeneous medium, tantalum pentaethoxide is not a precursor of an active species.

2-a A mass of 1.26 g of silica 500 is placed in a Schlenk tube equipped with a pig-tail store comprising approximately 500 mg of tantalum pentaethoxide under vacuum. This store is opened and the tantalum compound is sublimed in order to be brought into contact with the silica. The grafting reaction is carried out by heating the silica and the tantalum pentaethoxide at 120° C. for 3 hours. The excess tantalum compound is subsequently removed by carefully washing the solid, which has not been re-exposed to the air, on a sintered glass under argon atmosphere four times with 20 ml of thoroughly dehydrated pentane. The solid collected by filtration is dried under vacuum (5×10$^{-5}$ mbar) for 20 hours at 60° C. Chemical analysis of the solid gives a content by mass of tantalum of 4.87% and a C/Ta atomic ratio of 8.9; by $^{13}$C NMR of the solid, two peaks are observed exhibiting chemical shifts of approximately 18 and 70 ppm, attributed respectively to the carbon atoms in the positions γ and β to the tantalum atom in a structure of the Ta—O—C$_{(\beta)}$H$_2$—C$_{(\gamma)}$H$_3$ type firmly grafted to the surface of the silica.

A mass of 228 mg of this solid (62 µmol Ta) is placed in a 50 ml round-bottomed flask under an argon atmosphere and 3 ml of dichloromethane are added. The suspension is cooled to 0° C. and 70 µl of a 1.0M solution of diisopropyl (+)-tartrate (70 µmol) are added thereto. The combined mixture is left to stir under an argon atmosphere for 48 hours at 0° C. An mount of 17.4 mg of allyl alcohol (300 µmol) is subsequently introduced and the combined mixture is left to stir for 30 minutes. An amount of 0.1 ml of a 6.0M solution of TBHP in dichloromethane (600 µmol) is added and the solution is left to stir under argon for 48 hours at 0° C. A glycidol yield of 48% and a degree of conversion of the allyl alcohol of 52%, thus a selectivity of 92%, for an enantiomeric excess of 83% (predominantly S-glycidol) are obtained.

2-b The same reaction was repeated but this time it was carried out in a homogeneous medium, using 111 mg of tantalum pentaethoxide (274 µmol) instead of the solid prepared by sublimation of this same compound onto silica (Example 2-a), with 2 g of powdered zeolite 3 Å, 130 ml dichloromethane and 0.3 ml of a 1.0M solution of diisopropyl (+)-tartrate (300 µmol) in dichloromethane. The combined mixture is stirred in a 250 ml round-bottomed flask for 4 hours at 0° C. 794 mg of allyl alcohol (13.7 mmol) and then, 30 minutes later, 4.5 ml of a 6.0M solution of TBHP in dichloromethane (27 mmol), which solution is dried beforehand over 3 Å sieve, are subsequently introduced successively. This corresponds to a Ta/allyl alcohol molar ratio of approximately 2/100. The combined mixture is left to stir for 48 hours at 0° C. in order for the epoxidation reaction to take place. The glycidol is produced with a very low yield of 0.4%, for a conversion of the allyl alcohol of 0.5% and with an enantiomeric excess of 45% (predominantly R-glycidol, in contrast to Example 2-a using a solid catalyst).

Example 3

This example shows that a slight change in the experimental conditions (in this instance, essentially a change in the concentration of the allyl alcohol in the medium, which is approximately 1.0M instead of 0.1M in Example 2-a) can result in an improvement in the enantiomeric excess.

A mass of 198 mg of a solid, prepared as in example 2-a and exhibiting a content by mass of tantalum of 2.79% (29 μmol Ta), is placed in a 50 ml round-bottomed flask under an argon atmosphere and 2.74 ml of dichloromethane are added. The suspension is cooled to 0° C. and 70 μl of 1.0M solution of diisopropyl (+)-tartrate (70 μmol) are added thereto. The combined mixture is left to stir under an argon atmosphere for 48 hours at 0° C. An amount of 165.9 mg of allyl alcohol (2.86 mmol) is subsequently introduced and the combined mixture is left to stir for 30 minutes. An amount of 1.14 ml of a 5.0M solution of TBHP in dichloromethane (5.7 mmol) is added and the solution is left to stir under argon for 24 hours at 0° C. A glycidol yield of 34% and a degree of conversion of the allyl alcohol of 45%, thus a selectivity of 76%, for an enantiomeric excess of 98.5% (predominantly S-glycidol) are obtained.

Example 4

This example illustrates the fact that the catalyst of Example 2 can be prepared by other routes which result in an even more active catalyst.

4-a The carbene compound used for the deposition of tantalum, of formula $((CH_3)_3CCH_2)_3Ta=CHC(CH_3)_3$, was synthesized according the procedure described by Schrock et al. (*J. Am. Chem. Soc.*, 1978, 100, 3359). A mass of approximately 100 mg of this compound is carefully transferred under argon into a store terminating in a "pig-tail". This store is connected to a glass Schlenk tube comprising 700 mg of silica 500. The carbene compound is brought into contact with the silica by breaking the pig-tail of the store and the complex is sublimed towards the silica by heating at 80° C. (the temperature of the solid must be less than 100° C.). The gases given off during the reaction are cryogenically trapped and then analyzed by GC. The excess organometallic compound is removed by reverse sublimation and then the store comprising the unreacted complex is taken out by sealing it off. Ethanol vapors are introduced into the reactor (the total amount of ethanol introduced must be greater than 0.1 mol of ethanol per gram of silica). The combined mixture is left, the solid being heated for 15 hours at 150° C. The excess alcohol is then removed by placing the reactor under vacuum for 12 hours while maintaining the temperature of the solid at 150° C. Chemical analysis gives a content with a mass of tantalum of 3.36% (C/Ta=12); by $^{13}C$ NMR of the solid, two peaks are observed, as above, exhibiting chemical shifts of approximately 18 and 70 ppm.

An amount of 134 mg (25 μmol of Ta) of this solid is placed in a 50 ml round-bottomed flask and 10 ml of dichloromethane are added. The combined mixture is cooled to 0° C. and 26 μl of a 1.0M solution of diisopropyl (+)-(R,R)-tartrate (26 μmol) are introduced. The suspension is left to stir at this temperature for 15 hours, 65 mg of allyl alcohol (1.124 mmol) are then introduced and the mixture is left for 30 min before introducing 0.4 ml of a 6.0M solution of TBHP in dichloromethane (approximately 2.4 mmol). The medium is left for 48 hours at 0° C. in order for the epoxidation reaction to take place. It is subsequently filtered through a sintered glass under argon and the solid catalyst is washed four times with dichloromethane at ambient temperature and the solutions are combined together. A known amount of n-$C_{12}$ is subsequently added. GC analysis gives a glycidol yield of 31%, a conversion of the allyl alcohol of 32%, i.e. a selectivity of 97%, and an enantiomeric excess of 85% (predominantly S-glycidol). Chemical analysis gives a content by mass of tantalum of 3.30% for the solid used and washed. The solution does not comprise detectable amounts of tantalum (<5 ppm). This shows that the tantalum does not pass into solution during the reaction.

4-b The carbene compound $((CH_3)_3CCH_2)_3Ta=CHC(CH_3)_3$ can also be grafted onto the silica by impregnation in a solvent instead of sublimation in the gas phase (cf. Example 3-a). A mass of 2.1 g of silica 500 is placed in an approximately 250 ml Schlenk tube. A solution comprising 350 mg of the compound $((CH_3)_3CCH_2)_3Ta=CHC(CH_3)_3$ (0.75 mmol) dissolved in 20 ml of carefully dehydrated pentane is added thereto dropwise via a dropping funnel. The mixture is subsequently left to stir for one hour at ambient temperature. The excess organometallic compound is removed by reverse sublimation. Chemical analysis gives a content by mass of tantalum of 5.40% and a C/Ta molar ratio of 13. The amount of neopentane given off during the impregnation was measured by GC and an NpH/Ta molar ratio of 1.52 is obtained. The treatment under ethanol vapors is carried out as in the preceding example. Release of neopentane takes place, the amount of which was also measured by GC, and an NpH/Ta molar ratio of 2.50 is obtained. Thus, overall, 4.0 mol of neopentane were emitted per mole of tantalum grafted during the preparation, which corresponds to the loss of the three neopentyl ligands and of the neopentylidine ligand situated around the tantalum atom in the starting compound $((CH_3)_3CCH_2)_3Ta=CHC(CH_3)_3$ used. The excess alcohol is removed as above by placing the sample under vacuum (P<5×10$^{-5}$ mbar) for 30 minutes at 150° C. Elemental analysis shows that the solid comprises 5.40% of tantalum and a C/Ta molar ratio of 7.2 is determined; by $^{13}C$ NMR of the solid, two peaks are observed, as above, exhibiting chemical shifts of approximately 18 and 70 ppm.

An amount of 254 mg (76 μmol of Ta) of this solid is placed in a 100 ml round-bottomed flask with approximately 500 mg of thoroughly dehydrated powdered zeolite 3 Å, and 38 ml dichloromethane are added. The combined mixture is cooled to 0° C. and 84 μl of a 1.0M solution of diisopropyl (+)-(R,R)-tartrate (84 μmol) in dichloromethane are introduced. The suspension is left to stir at this temperature for 15 hours, then 228 mg of allyl alcohol (3.8 mmol) are introduced and the mixture is left for 30 min before introducing 1.0 ml of 6.5M solution of TBHP (tBuOOH) in dichloromethane (approximately 6.5 mmol). The medium is left for 48 ours at 0° C. in order for the epoxidation reaction to take place. It is subsequently filtered through a sintered glass under argon and the solid catalyst is washed four times with dichloromethane at ambient temperature and the solutions are combined together. A known amount of n-$Cl_{12}$ is subsequently added. Analysis by GC gives a glycidol yield of 56%, a conversion of the allyl alcohol of 60%, i.e. a selectivity of 93%, and an enantiomeric excess of 85% (predominantly S-glycidol).

Example 5

A mass of 261 mg of a solid exhibiting a content by mass of tantalum of 4.92% (72 μmol of Ta), prepared as indicated in Example 4-b, is placed in a 50 ml round-bottomed flask. 3.8 ml of dichloromethane are subsequently added and the combined mixture is cooled to 0° C., and then 75 μl of a 1.0M solution of diisopropyl (+)-(R,R)-tartrate (75 μmol) are introduced. The suspension is left to stir at this temperature for 15 hours, then 22.8 mg of allyl alcohol (0.38 mmol) are introduced and the mixture is left to stir for 30 min before introducing 0.15 ml of a 6.5M solution of TBHP in dichloromethane (approximately 0.97 mmol). The concentration of allyl alcohol in the solution is 0.094M. The medium is left for 48 hours at 0° C. in order for the epoxidation reaction to take place. It is subsequently filtered through a sintered glass under argon and the solid catalyst is washed four times with dichloromethane at ambient temperature and the solutions are combined together. Analysis by GC gives a glycidol yield of 77%, a conversion of the allyl alcohol of 79%, i.e. a selectivity of 98%, and an enantiomeric excess of 84% (predominantly S-glycidol).

Example 6

An amount of 258 mg of a solid, prepared as in Example 4-b and exhibiting a content by mass of tantalum of 5.63% (80 μmol of Ta), is placed in a 50 ml round-bottomed flask and 9 ml dichloromethane are added. The combined mixture is cooled to 0° C., and 0.1 ml of a 1.0M solution of diisopropyl (+)-(R,R)-tartrate (100 μmol) is introduced. The suspension is left to stir at this temperature for 15 hours, then 227 mg of allyl alcohol (3.91 mmol) are introduced and the mixture is left for 30 min before introducing 1 ml of a 5.0M solution of TBHP in dichloromethane (approximately 5 mmol). The Ta/allyl alcohol ratio is approximately 2/100 and the concentration of allyl alcohol in the solution is 0.38M. The medium is left for 48 hours at 0° C. in order for the epoxidation reaction to take place. It is subsequently filtered through a sintered glass under argon and the solid catalyst is washed four times with dichloromethane at ambient temperature and the solutions are combined together. A known amount of n-Cl$_{12}$ is subsequently added. Analysis by GC gives a glycidol yield of 19.5%, a conversion of the allyl alcohol of 20%, i.e. a selectivity of 98%, and an enantiomeric excess of 94% (predominantly S-glycidol).

Example 7

An amount of 508 mg of a solid, prepared as in Example 4-b and exhibiting a content by mass of tantalum of 4.92% (138 μmol of Ta), is placed in a 150 ml round-bottomed flask and 65 ml of dichloromethane are added. The combined mixture is cooled to 0° C., and 0.15 ml of a 1.0M solution of diisopropyl (+)-(R,R)-tartrate (150 μmol) is introduced. The suspension is left to stir at this temperature for 15 hours, then 400 mg of allyl alcohol (6.9 mmol) are introduced and the mixture is left for 30 min before introducing 2 ml of a 6.5M solution of TBHP in dichloromethane (approximately 13 mmol). The concentration of allyl alcohol in the solution is 0.10M. The medium is left for 48 hours at 0° C. in order for the epoxidation reaction to take place. It is subsequently filtered through a sintered glass under argon and the solid catalyst is washed four times with dichloromethane at ambient temperature and the solutions are combined together. A known amount of n-C$_{12}$ is subsequently added. Analysis by GC gives a glycidol yield of 30%, a conversion of the allyl alcohol of 31%, i.e. a selectivity of 97%, and an enantiomeric excess of 84% (predominantly S-glycidol).

Example 8

This example shows that, by using diisopropyl (−)-tartrate as chiral inductor instead of the diisopropyl (+)-tartrate which was employed in the preceding examples, the predominant product is the other enantiomer of glycidol, R-glycidol.

The reaction is carried out exactly as in Example 7 but this time using a 1.0M solution of diisopropyl (−)-(S,S)-tartrate. Analysis by GC gives a glycidol yield of 29%, a conversion of the allyl alcohol of 30%, i.e. a selectivity of 97%, and an enantiomeric excess of 83% (predominantly R-glycidol).

Example 9

This example shows that, by carrying out the reaction at a temperature of 20° C. instead of 0° C., different results are obtained with, in particular, a poorer enantiomeric excess.

The reaction is carried out exactly as in Example 7 but the medium is this time maintained at 20° C. throughout the experiment. It is subsequently filtered through a sintered glass under argon, the solid catalyst is washed four times with dichloromethane at ambient temperature and the solutions are combined together. A known amount of n-C$_{12}$ is subsequently added. Analysis by GC gives a glycidol yield of 35%, a conversion of the allyl alcohol of 45%, i.e. a selectivity of 78%, and an enantiomeric excess of 50% (predominantly S-glycidol).

Example 10

This example shows that it is possible to use a Ta/allyl alcohol molar ratio of less than 2/10 000 instead of approximately 2/100 in the above examples.

An amount of 14 mg of a solid, prepared as in Example 4-a and exhibiting a content by mass of tantalum of 5.0% (3.9 μmol of Ta), is placed in a 100 ml round-bottomed flask and 50 ml of dichloromethane are added. The combined mixture is cooled to 0° C. and 5 μl of a 1.0M solution of diisopropyl (+)-(R,R)-tartrate (5 μmol) are introduced. The suspension is left to stir at this temperature for 4 hours, then 8.5 ml of a 6M solution of TBHP (tBuOOH) in dichloromethane (approximately 51 mmol) are introduced and the mixture is left to stir for 30 min before introducing 1.42 g of allyl alcohol (24.5 mmol). The Ta/allyl alcohol molar ratio is thus approximately 2/12 500 and the concentration of allyl alcohol in the solution is 0.41M. The medium is left for 52 hours at 0° C. in order for the epoxidation reaction to take place. It is subsequently filtered through a sintered glass under argon and the solid catalyst is washed four times with dichloromethane at ambient temperature and the solutions are combined together. A known amount of n-C$_{12}$ is subsequently added. Analysis by GC gives a glycidol yield of 9%, a conversion of the allyl alcohol of 90%, i.e. a selectivity of 100%, and an enantiomeric excess of 80% (predominantly S-glycidol).

Example 11

This example shows that the epoxidation reaction can be carried out and is highly enantioselective with virtually pure allyl alcohol, without any other solvent.

An amount of 240 mg of a solid, prepared as in Example 4-b and exhibiting a content by mass of tantalum of 5.63% (75 μmol of Ta), is placed in a 50 ml round-bottomed flask and 5 ml of dichloromethane are added. The combined mixture is cooled to 0° C. and 80 μl of a 1.0M solution of diisopropyl (+)-(R,R)-tartrate (80 μmol) are introduced. The suspension is left to stir at this temperature for 15 hours and then the solvent is evaporated under vacuum. 4.45 g of allyl alcohol (76.72 mmol) are added to this dry residue and the mixture is left for 30 min before introducing 12 ml of 6.0M solution of TBHP in dichloromethane (approximately 72 mmol). The medium is left for 48 hours at 0° C. in order for the epoxidation reaction to take place. It is subsequently filtered through a sintered glass under argon and the solid catalyst is washed four times with dichloromethane at ambient temperature and the solutions are combined together. A known amount of n-$C_{12}$ is subsequently added. Analysis by GC gives a glycidol yield of 5.2%, a conversion of the allyl alcohol of 5.5%, i.e. a selectivity of 95%, and an enantiomeric excess of 93% (predominantly S-glycidol).

The various results relating to the asymmetric epoxidation of allyl alcohol to glycidol are presented in Table 1.

| Catalyst[a] | M/allyl alcohol (M = Ta or Ti) | Reaction conditions[b] | Conversion of the allyl alcohol | Glycidol yield | Selectivity for glycidol | % Enantiomeric excess[c] (predominantly) | Rotation number[d] |
|---|---|---|---|---|---|---|---|
| Homogeneous Ta(OEt)$_5$ | 2/100 (Example 2-b) | 0° C. (+)-DIPT with zeolite TBHP | 0.5% | 0.4% | 80% | −45% (R) | 0.2 |
| Sublimed [Ta] 5.5% | 2/12 500 (Example 10) | 0° C. (+)-DIPT without zeolite TBHP | 9% | 9% | 100% | 80% (S) | 560 |
| Sublimed [Ta] 3.36% | 2/100 (Example 4-a) | 0° C. (+)-DIPT without zeolite TBHP | 32% | 31% | 97% | 85% (S) | 15 |
| Impregnated [Ta] 4.92% | 2/100 (Example 7) | 0° C. (+)-DIPT without zeolite TBHP | 31% | 30% | 97% | 84% (S) | 15 |
| Impregnated [Ta] 4.92% | 2/100 (Example 8) | 0° C. (−)-DIPT without zeolite TBHP | 30% | 29% | 97% | −83% (R) | 15 |
| Impregnated [Ta] 5.63% | 2/100 (Example 6) | 0° C. (+)-DIPT without zeolite TBHP | 20% | 19.5% | 98% | 94% (S) | 10 |
| Impregnated [Ta] 5.40% | 2/100 (Example 4-b) | 0° C. (+)-DIPT with zeolites TBHP | 60% | 56% | 93% | 85% (S) | 30 |
| Impregnated [Ta] 4.92% | 19/100 (Example 5) | 0° C. (+)-DIPT without zeolite TPHP | 79% | 77% | 98% | 84% (S) | 4 |
| Impregnated [Ta] 5.63% | 1/1 028 (Example 11) | 0° C. (+)-DIPT without zeolite without solvent TBHP | 5.5% | 5.2% | 95% | 93% (S) | 53 |
| Impregnated [Ta] 5.40% | 2/100 (Example 9) | 20° C. (+)-DIPT without zeolite TBHP | 45% | 35% | 78% | 50% (S) | 18 |
| Sublimed Ta(OEt)$_5$ 2.79% | 1/100 (Example 3) | 0° C. (+)-DIPT without zeolite TBHP | 45% | 34% | 76% | 98.5% (S) | 34 |
| Sublimed Ta(OEt)$_5$ 4.87% | 20/100 (Example 2-a) | 0° C. (+)-DIPT without zeolite TBHP | 52% | 50% | 96% | 83% (S) | 2.5 |
| Homogeneous Ti(OiPr)$_4$ | 5/100 (Example 1-b) | 0° C. (+)-DIPT with zeolites CHP | 76% | 72% | 95% | 80% (S) | 14 |

Key to Table 1
[a]The catalysts are prepared from tantalum compounds grafted to silica 500 either by impregnation in pentane or by sublimation of the compound under vacuum. [Ta] denotes the compound ((CH$_3$)$_3$CCH$_2$)$_3$Ta=CHC(CH$_3$)$_3$. Two tests in a homogeneous medium are mentioned, from Ta(OEt)$_5$ and Ti(OiPr)$_4$.
[b]Reaction temperature - Chiral inductor ((+) - DIPT = DiIsoPropyl (R,R)-Tartrate) - Presence or absence of zeolite - Oxidant (TBHP = tert-butyl hydroperoxide or CHP = cumyl hydroperoxide)
[c]Enantiomeric excess (e.e.) = [(S) − (R)]/[(S) + (R)]; with (S): amount of S-glycidol and (R): amount of R-glycidol which are obtained at the end of the reaction.
[d]Rotation number: number of allyl alcohol molecules converted to glycidol per Ta atom.

Example 11a

This example shows that a modification to the heat treatment of the oxide support can make it possible to improve the performance of the catalyst. In this case, an Aerosil silica treated under vacuum at 700° C. (silica 700) is used as support instead of the silica 500 of the preceding examples. The example is carried out as in Example 4-b but starting from a mass of 3 g of silica 700, to which a solution comprising 500 mg of the compound $((CH_3)_3CCH_2)_3Ta=CHC(CH_3)_3$ (1.08 mmol) dissolved in 30 ml of pentane is added dropwise. The amount of neopentane given off during the impregnation was measured by GC and an NpH/Ta$_{grafted}$ molar ratio of 1.05 is obtained. The treatment under ethanol vapors is carried out as described above. An evolution of neopentane takes place, the amount of which was also measured by GC, and an NpH/Ta$_{grafted}$ molar ratio of 2.95 is obtained. Thus, overall, 4.0 mol of neopentane were clearly emitted per mole of tantalum which grafted during the preparation. The excess alcohol is removed as above by placing under vacuum. Elemental analysis shows that the solid comprises 5.63% of tantalum and a C/Ta molar ratio of 8.0 is determined; by $^{13}C$ NMR of the solid, two peaks are observed, as above, exhibiting chemical shifts of approximately 18 and 70 ppm.

An amount of 57 mg (18 μmol of Ta) of this solid is placed in a 50 ml round-bottomed flask with 15 ml of dichloromethane. The combined mixture is cooled to 0° C. and 22 μl of a 1.0M solution of diisopropyl (+)-(R,R)-tartrate (22 μmol) in dichloromethane are introduced. The suspension is left to stir at this temperature for 15 hours, then 90 mg of allyl alcohol (1.5 mmol) are introduced and the mixture is left for 30 min before introducing 0.46 ml of a 6.5M solution of TBHP (t-BuOOH) in dichloromethane (approximately 3 mmol) After 48 hours at 0° C. and then separation of the catalyst by filtration, analysis by GC gives a glycidol yield of 61%, a conversion of the allyl alcohol of 62%, i.e. a selectivity of 97%, and an enantiomeric excess of 87% (predominantly S-glycidol).

Example 11b

This example shows that the treatment of the oxide support with another compound, such as hexamethyldisilazane (HMDS), before the grafting of the tantalum can also make it possible to improve the performances of the catalyst. In this case, the reaction is carried out as in Example 4-b; the support is an Aerosil silica treated under vacuum at 500° C. (silica 500), a mass of 4 g of which has been treated with 50 ml of 10$^{-2}$M solution of HMDS in pentane under argon. The pentane is subsequently selectively removed by placing under vacuum. This then gives a novel support, a silica 500 impregnated with HMDS, which is used for the preparation of the catalyst by impregnation of the tantalum compound $((CH_3)_3CCH_2)_3Ta=CHC(CH_3)_3$. This impregnation and the treatment under ethanol vapor are subsequently carried out as indicated in Example 4-b.

An amount of 75 mg (22 μmol of Ta) of the solid thus obtained is placed in a 50 ml round-bottomed flask with 10 ml of dichloromethane. The combined mixture is cooled to 0° C. and 23 μl of a 1.0M solution of diisopropyl (+)-(R, R)-tartrate (23 μmol) in dichloromethane are introduced. The suspension is left to stir at this temperature for 15 hours, then 90 mg of allyl alcohol (1.16 mmol) are introduced and the mixture is left for 30 min before introducing 0.35 ml of a 6.5M solution of TBHP (t-BuOOH) in dichloromethane (approximately 2.3 mmol). After 48 hours at 0° C. and then separation of the catalyst by filtration, analysis by GC gives a glycidol yield of 65%, a conversion of the allyl alcohol of 62%, i.e. a selectivity of 95%, and an enantiomeric excess of 84% (predominantly S-glycidol).

Example 11c

In this example, it is shown that the catalyst can be used in various solvents while exhibiting good performance. The solid described in the preceding example (11b) is used under identical conditions for catalyzing the epoxidation of 2-propen-1-ol by using, as solvent, dichloromethane or pentane or toluene. The results obtained are mentioned in the table below:

| Solvent | $CH_2Cl_2$ | Pentane | Toluene |
|---|---|---|---|
| Conversion of the 2-propen-1-ol | 66% | 55% | 30% |
| Glycidol yield | 64% | 50% | 28% |
| Selectivity of the reaction | 98% | 91% | 93% |
| Enantiomeric excess | 86% | 88% | 89% |

Example 12

This example and those which follow show that the catalysts described in the preceding examples apply not only to allyl alcohol itself but also to numerous other alcohols.

An amount of 500 mg of the solid prepared in Example 4-b, exhibiting a content by mass of tantalum of 5.40% (149 μmol of Ta) is placed in a 100 ml round-bottomed flask with 40 ml of solvent ($CH_2Cl_2$). The combined mixture is cooled to −20° C., 31 mg of diethyl (+)-tartrate (160 μmol) are introduced and the mixture is left to stir at −20° C. for 15 hours. 400 mg of trans-2-hexen-1-ol (4.0 mmol) are then added and, 30 minutes later, 1.6 ml of a 6.0M solution of TBHP in dichloromethane (9.6 mmol). The medium is left at −20° C. for 48 hours in order for the epoxidation reaction to take place. The medium is filtered through a sintered glass under argon, the solid catalyst is washed four times with dichloromethane at ambient temperature and the solutions are combined together. Analysis by GC gives a propyloxiranemethanol yield of 34%, a conversion of the trans-2-hexen-1-ol of 35%, i.e. a selectivity of 97%, and an enantiomeric excess of 89% (predominantly (S,S)-propyloxiranemethanol).

Example 13

This example illustrates the fact that the catalyst described in Example 12 can be recycled without a significant loss in activity.

The solid catalyst of Example 12, after having been washed four times with dichloromethane on a sintered glass at the end of the reaction (1st use), as was mentioned, is reused for a fresh reaction, the conditions of Example 12 being exactly reproduced. The results are then very similar to those obtained during the first use, with a propyloxiranemethanol yield of 31%, a conversion of the trans-2-hexen-1-ol of 35%, i.e. a selectivity of 89%, and an enantiomeric excess of 93% (predominantly (S,S)-propyloxiranemethanol).

Example 14 (Comparative Example)

This example shows that the reaction for the epoxidation of trans-2-hexen-1-ol to propyloxiranemethanol is more selective with catalysis by a supported tantalum compound (Example 14-a) than with homogeneous catalysis from the compound Ta(OEt)$_5$ (Example 14-b). The case of homogeneous catalysis using a titanium complex Ti(OiPr)$_4$ is given by way of comparison (Example 14-c).

14-a An amount of 250 mg of the solid prepared in Example 4-b, exhibiting a content by mass of tantalum of 5.40% (75 μmol of Ta), is placed in a 50 ml round-bottomed flask with approximately 150 mg of thoroughly dehydrated powdered zeolite 3 Å, and 18 ml of dichloromethane are added. The combined mixture is cooled to −20° C. and 84 μl of 1.0M solution of diethyl (+)-(R,R)-tartrate (84 μmol) are introduced. The suspension is left to stir at this temperature for 15 hours, then 188 mg of trans-2-hexen-1-ol (1.9 mmol) are introduced and the mixture is left to stir for 30 min before introducing 0.6 ml of a 6.5M solution of TBHP (tBuOOH) in dichloromethane (approximately 3.9 mmol). The medium is left for 48 hours at −20° C. in order for the epoxidation reaction to take place. It is subsequently filtered through a sintered glass under argon and the solid catalyst is washed four times with dichloromethane at ambient temperature and the solutions are combined together. Analysis by GC gives a propyloxiranemethanol yield of 40%, a conversion of the trans-2-hexen-1-ol of 48%, i.e. a selectivity of 83%, and an enantiomeric excess of 90% (predominantly (S,S)-propyloxiranemethanol).

14-b The same reaction was repeated but this time it was carried out in a homogeneous medium and by using 114 mg of tantalum pentaethoxide (281 μmol) instead of the solid prepared by sublimation of this same compound onto silica, with approximately 250 mg of powdered zeolite 3 Å, 50 ml of dichloromethane and 0.3 ml of a 1.0M solution of diethyl (+)-(R,R)-tartrate (300 μmol) in dichloromethane. The combined mixture is stirred in a 250 ml round-bottomed flask for 4 hours at −20° C. 535 mg of trans-2-hexen-1-ol (5.35 mmol) and then, 30 minutes later, 2.5 ml of a 5.0M solution of TBHP in dichloromethane (12.5 mmol), which solution is dried beforehand over a 3 Å sieve, are subsequently introduced successively. This corresponds to a Ta/allyl alcohol molar ratio of approximately 5/100. The combined mixture is left to stir for 48 hours at −20° C. in order for the epoxidation reaction to take place. Analysis by GC gives a propyloxiranemethanol yield of 23%, a conversion of the trans-2-hexen-1-ol of 50%, i.e. a selectivity of 46%, and an enantiomeric excess of 55% (predominantly (R,R)-propyloxiranemethanol), in contrast to Example 14-a using a solid catalyst, for which it is the (S,S) isomer of propyloxiranemethanol which is selectively obtained).

14-c The procedure indicated in the preceding example (14-b) was repeated but by carrying out the reaction with Ti(OiPr)$_4$(253 μmol) instead of Ta(OEt)$_5$. After reaction, analysis of the solution by GC gives a propyloxiranemethanol yield of 80%, a conversion of the trans-2-hexen-1-ol of 99%, i.e. a selectivity of 81%, and an enantiomeric excess of 96% (predominantly (S,S)-propyloxiranemethanol).

Example 15

A mass of 230 mg of the solid prepared as indicated in Example 2-a, exhibiting a content by mass of tantalum of 4.87% (62 μmol of Ta), is placed in a 50 ml round-bottomed flask under an argon atmosphere and 15 ml of dichloromethane are added. The suspension is cooled to −20° C. and 70 μl of a 1.0M solution of diethyl (+)-tartrate (70 μmol) are added thereto. The medium is left to stir under an argon atmosphere for 48 hours at −20° C. An amount of 155 mg of propyloxiranemethanol (1.55 mmol) is subsequently introduced and the combined mixture left to stir for 30 minutes. An amount of 0.6 ml of a 6.0M solution of TBHP in dichloromethane (3.6 mmol) is added and the solution is left to stir under argon for 48 hours at −20° C. A propyloxiranemethanol yield of 31% and a degree of conversion of the trans-2-hexen-1-ol of 33%, thus a selectivity of 94%, for an enantiomeric excess of 90% (predominantly (S,S)-propyloxiranemethanol) are obtained.

After recycling the catalyst as in Example 13 and by carrying out the reaction under the same conditions as during the first use, a propyl-oxiranemethanol yield of 23% and a degree of conversion of the trans-2-hexen-1-ol of 26%, thus a selectivity of 88%, for an enantiomeric excess of 90% (predominantly (S,S)-propyloxiranemethanol) are obtained.

Example 16

An amount of 675 mg of the solid prepared as indicated in Example 4-a, exhibiting a content by mass of tantalum of 0.67% (25 μmol of Ta), is placed in a 50 ml round-bottomed flask under an argon atmosphere and 12 ml of dichloromethane are added. The combined mixture is cooled to −20° C. and 28 μl of 1.0M solution of diethyl (+)-(R,R)-tartrate (28 μmol) are introduced. The suspension is left to stir at this temperature for 15 hours, then 125 mg of trans-2-hexen-1-ol (1.25 mmol) are introduced and the mixture is left for 30 min before introducing 0.4 ml of a 6.5M solution of TBHP (tBuOOH) in dichloromethane (approximately 2.6 mmol). The medium is left for 48 hours at −20° C. in order for the epoxidation reaction to take place. The medium is filtered through a sintered glass under argon and the solid catalyst is washed four times with dichloromethane at ambient temperature and the solutions are combined together. Analysis by GC gives a propyloxiranemethanol yield of 25%, a conversion of the trans-2-hexen-1-ol of 33%, i.e. a selectivity of 75%, and an enantiomeric excess of 90% (predominantly (S,S)-propyloxiranemethanol).

Example 17

An amount of 500 mg of the solid prepared in Example 4-b, exhibiting a content by mass of tantalum of 5.40% (149 μmol of Ta), is placed in a 100 ml round-bottomed flask with 40 ml of solvent (CH$_2$Cl$_2$). The combined mixture is cooled to 0° C., 31 mg of diethyl (+)-tartrate (160 μmol) are introduced and the mixture is left to stir at 0° C. for 15 hours. 400 mg of trans-2-hexen-1-ol (4.0 mmol) are then added and, 30 minutes later, 1.6 ml of a 6.0M solution of TBHP in dichloromethane (9.6 mmol). The medium is left for 48 hours at 0° C. in order for the epoxidation reaction to take place. The medium is filtered through a sintered glass under argon, the solid catalyst is washed four times with dichloromethane at ambient temperature and the solutions are combined together. Analysis by GC gives a propyloxiranemethanol yield of 14%, a conversion of the trans-2-hexen-1-ol of 25%, i.e. a selectivity of 56%, and an enantiomeric excess of 40% (predominantly (S,S)-propyloxiranemethanol).

Various results relating to the asymmetric epoxidation of trans-2-hexen-1-ol to propyloxirane-methanol are presented in Table 2.

| Catalyst[a] | M/allyl alcohol (M = Ta or Ti) | Reaction conditions[b] | Conversion of the trans-2-hexen-1-ol | Epoxy alcohol yield | Selectivity for epoxy alcohol | % Enantiomeric excess[c] (predominantly) | Rotation number[d] |
|---|---|---|---|---|---|---|---|
| Homogeneous Ta(OEt)₅ | 2/100 (Example 14-b) | −20° C. (+)-DET with zeolites TBHP | 50% | 23% | 46% | −55% (R, R) | 11 |
| Sublimed [Ta] 0.67% | 2/100 (Example 16) | −20° C. (+)-DET without zeolite TBHP | 33% | 25% | 75% | 85% (S, S) | 13 |
| Impregnated [Ta] 5.40% | 4/100 (Example 12) | −20° C. (+)-DET without zeolite TBHP | 35% | 34% | 97% | 89% (S, S) | 8.5 |
| Impregnated [Ta] 5.40% | 4/100 (Example 14-a) | −20° C. (+)-DET with zeolites TBHP | 48% | 40% | 83% | 90% (S, S) | 10 |
| Impregnated [Ta] 5.40% | 4/100 (Example 17) | 0° C. (+)-DET without zeolite TBHP | 25% | 14% | 56% | 40% (S, S) | 3.5 |
| Sublimed Ta(OEt)₅ 4.87% | 4/100 (Example 15) | −20° C. (+)-DET without zeolite TBHP | 33% | 31% | 94% | 90% (S, S) | 8 |
| Homogeneous Ti(OiPr)₄ | 5/100 (Example 14-c) | −20° C. (+)-DET with zeolites TBHP | 99% | 80% | 81% | 96% (S, S) | 16 |

Key to Table 2
[a]The catalysts are prepared from tantalum compounds grafted to silica 500 either by impregnation in pentane or by sublimation of the compound under vacuum. [Ta] denotes the compound ((CH₃)₃CCH₂)₃Ta=CHC(CH₃)₃. Two tests in a homogeneous medium are mentioned, from Ta(OEt)₅ and Ti(OiPr)₄.
[b]Reaction temperature - Chiral inductor ((+)-DET = DiEthyl (R,R)-Tartrate) - Presence or absence of zeolite - Oxidant (TBHP = tert-butyl hydroperoxide).
[c]Enantiomeric excess (e.e.) = [(S,S) − (R,R)]/[(S,S) + (R,R)]; with (S,S): amount of (S,S)-propyloxiranemethanol and (R,R): amount of (R,R)-propyloxiranemethanol.
[d]Rotation number, defined as above (Table 1)

Conclusion

With solid tantalum-based catalysts, the enantiomeric excesses are of the same order of magnitude as, indeed even greater than, those obtained with titanium in homogeneous catalysis for epoxide yields ranging up to 80% and a selectivity close to 100%. It is clearly established that, in the invention, the effect of the surface tantalum species is indeed catalytic and not stoichiometric, since the calculation shows that at a temperature of 0° C., a tantalum atom can convert up to 500 molecules, indeed even more, of allyl alcohol to glycidol in 24 hours. The catalyst is filtered off and is reused for a fresh catalytic test and similar results are then obtained. The recycling can be carried out several times without significant loss in activity or in stereoselectivity. Furthermore, it can be demonstrated that the tantalum does not pass into solution and that the solid retains its same content of tantalum after several recycling operations. Surprisingly, if the same experiment is carried out with titanium complexes, a very low activity without an enantiomeric excess is then obtained.

It must be clearly understood that the invention refined by dependent claims is not limited to the specific embodiments indicated in the above description but encompasses alternative forms thereof which do not depart either from the scope or the spirit of the present invention.

What is claimed is:

1. A solid oxidation catalyst comprising a metal compound of a pentavalent or hexavalent metal M, selected from the group consisting of tantalum, vanadium, niobium, chromium, molybdenum and tungsten, grafted to the surface of a solid oxide by at least one covalent bond between an oxygen atom of the solid oxide and the metal atom M, the grafted metal compound exhibiting at least two alkoxy groups bonded to the metal via an oxygen atom, with said at least two alkoxy groups bonded to the metal M belonging to a chiral polyol unit.

2. The catalyst as claimed in claim 1, wherein the metal compound exhibits two alkoxy groups which are bonded to the metal with an oxygen atom and which belong to a chiral diol unit.

3. A catalyst as claimed in claim 2, characterized in that the diol unit is selected from the group consisting of:

1,2-propylene glycol
2,3-butanediol
3,4-dimethyl-3,4-hexanediol
4,5-octanediol
2,3-hexanediol
1,3-di(p-nitrophenyl)propane-1,2-diol
2,4-pentanediol
tartaric acid esters,
tartaric acid diamide
N,N-dimethyltartaric acid diamide
trans-1,2-cyclopentanediol
diethyl 1,2-cyclohexanediol-1,2-dicarboxylate
dimethyl 2,4-dihydroxyglutarate
ethyl N,N-diethyl tartrate monoamide
2,5-dioxo-3,4-octanediol 1,2-bisacetylethylene glycol bis-2,2'-(2-hydroxycaprolactone)

binaphthol, and 1,2-bis(methoxyphenyl)ethane-1,2-diol.

4. A catalyst as claimed in claim 1, characterized in that the alkoxy groups of OR type bonded to the metal M via the oxygen atom are identical or different and in that the R radicals are aliphatic or unsaturated, optionally cyclic, aromatic, $C_1$ to $C_{30}$ hydrocarbonaceous chains which can optionally be functionalized.

5. A catalyst as claimed in claim 4, characterized in that the R radical is a $C_1$ to $C_8$ hydrocarbonaceous chain.

6. A catalyst as claimed in claim 4, characterized in that the R radicals are selected from methyl, ethyl, n-propyl, isopropyl, n-butyl, isobutyl, tert-butyl, cyclohexyl, vinyl, allyl, phenyl or trialkylsilyl ($R_3Si$—; R=Me, Et, i-Pr or n-Bu).

7. A catalyst as claimed in claim 1, characterized in that the metal compound grafted to the solid oxide comprises 4 alkoxy groups where the metal M is selected from tantalum, vanadium or niobium and 4 or 5 alkoxy groups when the metal is selected from chromium, molybdenum or tungsten.

8. A catalyst as claimed in claim 1, characterized in that the solid oxide is selected from the group consisting of silica, alumina, silica/alumina, zeolites, silicalites, titanium oxide, niobium oxide, tantalum oxide and mesoporous silicas.

9. A process for the preparation of a solid oxidation catalyst, comprising bringing into contact a chiral polyol and a catalyst precursor made of solid oxide comprising a metal compound of a pentavalent or hexavalent metal M, selected from the group consisting of tantalum, vanadium, niobium, chromium, molybdenum and tungsten, grafted to the surface of a solid oxide by at least one covalent bond between an oxygen atom of the solid oxide and the metal atom M, the grafted metal compound comprising at least two alkoxy groups, and exchanging at least two alkoxy groups of the grafted metal compound with the polyol.

10. The process according to claim 9, wherein the chiral polyol is a chiral diol.

11. The process as claimed in claim 10, characterized in that the precursor catalyst and the chiral diol are reacted together in a solvent according to a diol:metal M molar proportion of at least 0.5.

12. The process as claimed in claim 10, characterized in that the chiral diol used is selected from the group consisting of:

1,2-propylene glycol 2,3-butanediol 3,4-dimethyl-3,4-hexanediol 4,5-octanediol 2,3-hexanediol 1,3-di(p-nitrophenyl)propane-1,2-diol 2,4-pentanediol tartaric acid esters tartaric acid diamide N,N-dimethyl tartaric acid diamide trans-1,2-cyclopentanediol diethyl 1,2-cyclohexanediol-1,2-dicarboxylate dimethyl 2,4-dihydroxyglutarate ethyl N,N-diethyl tartrate monoamide 2,5-dioxo-3,4-octanediol 1,2-bisacetylethylene glycol bis-2,2'-(2-hydroxycaprolactone)

binaphthol, and 1,2-bis(methoxyphenyl)ethane-1,2-diol.

13. The process as claimed in claim 11, characterized in that the chiral diol used is selected from the group consisting of:

1,2-propylene glycol 2,3-butanediol 3,4-dimethyl-3,4-hexanediol 4,5-octanediol 2,3-hexanediol 1,3-di(p-nitrophenyl)propane-1,2-diol 2,4-pentanediol tartaric acid esters tartaric acid diamide N,N-dimethyl tartaric acid diamide trans-1,2 cyclopentanediol diethyl 1,2-cyclohexanediol-1,2-dicarboxylate dimethyl 2,4-dihydroxyglutarate ethyl N,N-diethyl tartrate monoamide 2,5-dioxo-3,4-octanediol 1,2-bisacetylethylene glycol bis-2,2'-(2-hydroxycaprolactone)

binaphthol, and 1,2-bis(methoxyphenyl)ethane-1,2-diol.

14. The process as claimed in claim 9, characterized in that the alkoxy groups of OR type bonded to the metal M via the oxygen atom are identical or different and in that the R radicals are aliphatic or unsaturated, optionally cyclic $C_1$ to $C_{30}$ hydrocarbonaceous chains which can optionally be functionalized.

15. The process as claimed in claim 14, characterized in that the R radical is a $C_1$ to $C_8$ hydrocarbonaceous chain.

16. The process as claimed in claim 14, characterized in that the R radicals are selected from the group consisting of methyl, ethyl, n-propyl, isopropyl, n-butyl, isobutyl, tert-butyl, cyclohexyl, vinyl, allyl, phenyl, and trialkylsilyl ($R_3Si$—; R=Me, Et, i-Pr or n-Bu).

17. The process as claimed in claim 9, characterized in that the metal compound grafted to the solid oxide comprises 4 alkoxy groups where the metal M is selected from tantalum, vanadium or niobium; and 4 or 5 alkoxy groups when the metal is selected from chromium, molybdenum or tungsten.

18. The process as claimed in claim 9, characterized in that the solid oxide is selected from the group consisting of:

silica, alumina, silica/alumina, zeolites, silicalites, titanium oxide, niobium oxide, tantalum oxide and mesoporous silicas.

19. A process for the oxidation of prochiral compounds, comprising bringing into contact a prochiral compound, an oxidant, and a solid catalyst according to claim 1, and reacting said prochiral compound, oxidant and solid catalyst together.

20. The process according to claim 19 further comprising the asymmetric epoxidation of prochiral olefinic double bonds of a compound to be epoxidized, said compound being a carbinol compound exhibiting an ethylenic double bond which is separated from the carbinol group by 0 to 1 C atom, in which the compound to be epoxidized, an oxidant, and a chiral solid catalyst are brought into contact and are reacted together, said solid catalyst comprising a metal compound of a pentavalent or hexavalent metal M, selected from the group consisting of tantalum, vanadium, niobium, chromium, molybdenum and tungsten, grafted to the surface of a solid oxide by at least one covalent bond between an oxygen atom of the solid oxide and the metal atom M, the grafted metal compound exhibiting at least two alkoxy groups bonded to the metal via an oxygen atom, with said at least two alkoxy groups bonded to the metal M belonging to a chiral polyol unit.

21. The process as claimed in claim 19, characterized in that, at the end of the reaction, a solid oxide is recovered and is recycled.

22. The process as claimed in claim 21, wherein the solid oxide is a silica dehydrated between 200 and 800° C.

23. The process as claimed in claim 22, wherein the silica is treated with an organosilicon compound.

* * * * *